(12) United States Patent
Schrattenecker

(10) Patent No.: US 6,772,578 B2
(45) Date of Patent: Aug. 10, 2004

(54) HARVESTER, ESPECIALLY A COMBINE-HARVESTER

(76) Inventor: Franz Schrattenecker, Edenaichet 21, A 4773 Eggerding (AT)

( * ) Notice: Subject to any disclaimer, the term of this patent is extended or adjusted under 35 U.S.C. 154(b) by 0 days.

(21) Appl. No.: 10/290,669

(22) Filed: Nov. 8, 2002

(65) Prior Publication Data

US 2003/0089096 A1 May 15, 2003

(30) Foreign Application Priority Data

Nov. 9, 2001 (AT) .......................................... 1771/2001

(51) Int. Cl.[7] ............................................. A01D 57/02
(52) U.S. Cl. ......................................... 56/220; 56/14.4
(58) Field of Search ........................ 56/220, 221–227, 56/10.2 R, 14.4, 16.1, 219, 126, 12.4, 12.5, 14.3

(56) References Cited

U.S. PATENT DOCUMENTS

| | | | | |
|---|---|---|---|---|
| 1,806,584 A | * | 5/1931 | Borer | 56/17.5 |
| 3,271,939 A | * | 9/1966 | Granger, Jr. et al. | 56/10.5 |
| 3,283,487 A | * | 11/1966 | Jarvis | 56/222 |
| 4,142,348 A | * | 3/1979 | Jordan et al. | 56/10.2 R |
| 4,297,833 A | * | 11/1981 | Gaeddert | 56/364 |

FOREIGN PATENT DOCUMENTS

| | | |
|---|---|---|
| DE | 19508887 | 9/1996 |
| EP | 1133912 | 9/2001 |
| SU | 1304778 | 4/1987 |

* cited by examiner

*Primary Examiner*—Robert E Pezzuto
(74) *Attorney, Agent, or Firm*—Collard & Roe, P.C.

(57) ABSTRACT

A harvester, especially a combine-harvester, is proposed, comprising a pickup reel (2) held rotatably between supporting arms (1) and with a drive (3) for the pickup reel (2). In order to provide advantageous constructional conditions, the drive (3) is arranged within the pickup reel (2).

4 Claims, 2 Drawing Sheets

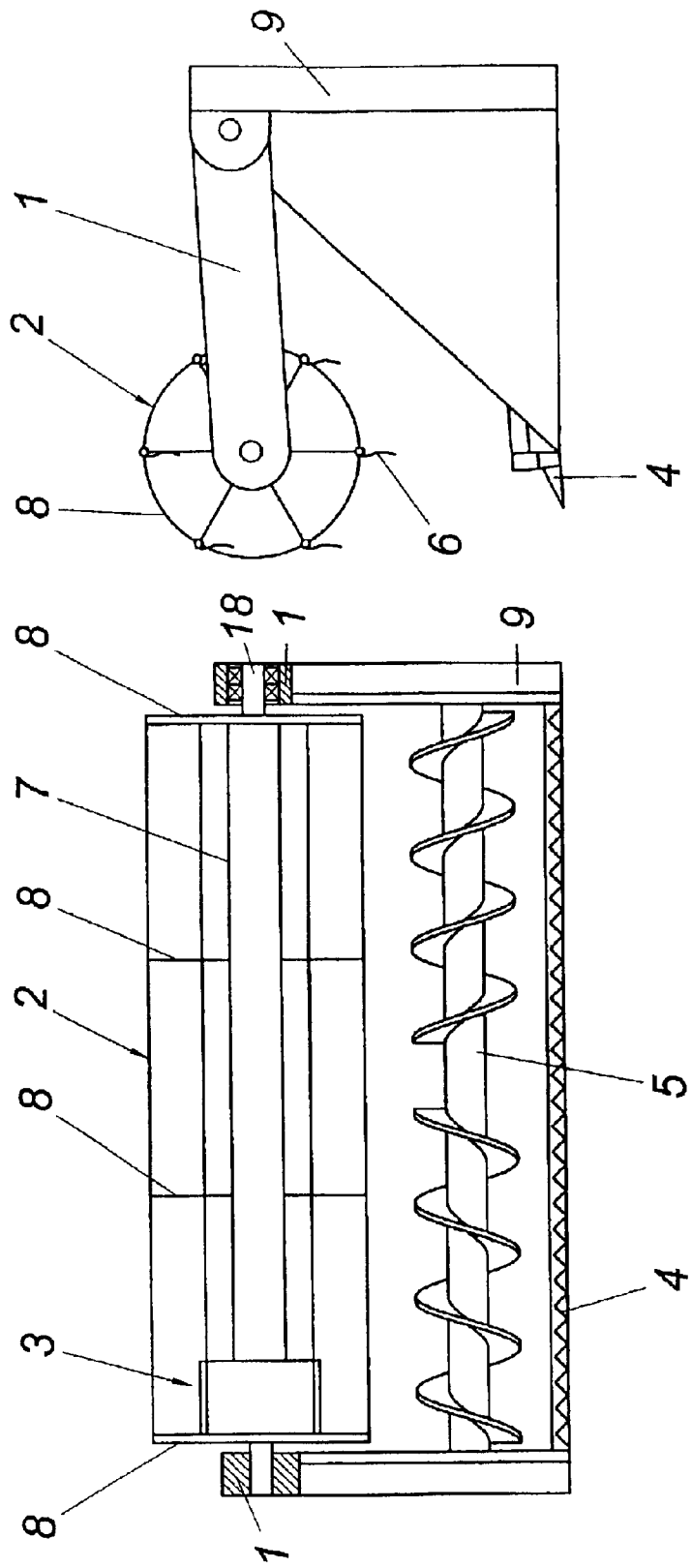

HARVESTER, ESPECIALLY A COMBINE-HARVESTER

CROSS REFERENCE TO RELATED APPLICATIONS

Applicant claims priority under 35 U.S.C. §119 of Austrian Patent Application No. A 1771/2001 filed Nov. 9. 2001.

1. Field of the Invention

The invention relates to a harvester, especially a combine-harvester, with a pickup reel held rotatably between supporting arms and with a drive for the pickup reel.

2. Description of the Prior Art

Known drives for pickup reels (EP 11 33 912 A, DE 195 08 887 C) comprise belt or chain drives which are arranged on the side of the pickup reel. The drive of the pickup reel occurs either directly from the side of the harvester via a mechanical drive connection or via a hydraulic engine which is hydraulically driven by the harvester. The disadvantageous aspect is that the drive means required for the drive of the pickup reel are arranged outside of the pickup reel, which enlarges the overall size of the harvester and leads to blockages or malfunctions of the drive means in the case of different cereals. This impairs the driving speed of the harvester on the one hand and the availability is decreased as a result of the increased susceptibility to malfunctions.

SUMMARY OF THE INVENTION

The invention is therefore based on the object of providing a harvester of the kind mentioned above in which blockages or malfunctions by harvested material is prevented in the zone of the reel drive and which makes do without drive means which extends beyond the width of the pickup reel.

This object is achieved in accordance with the invention in such a way that the drive is arranged within the pickup reel. If the drive is disposed within the pickup reel, the width of the harvester is substantially determined by the distance of the supporting arms and a drive of the pickup reel is obtained in a simple and elegant manner which operates without impairment and free of malfunctions.

Especially advantageous constructional conditions are obtained when the drive comprises an internally toothed gear rim which is connected with the pickup reel in a torsionally rigid way and is arranged coaxially to the rotational shaft of the pickup reel, a motor for the drive of the pickup reel and a housing, which motor is torsionally rigidly supported on at least one supporting arm by means of a bearing axle, with said motor engaging with a driving toothed wheel into the internal toothing or being arranged with the same into a planetary drive. The drive unit made of gear rim and motor is arranged thereby within the pickup reel in the housing. The housing can enclose the drive unit either completely or only partly, but in any case it should keep the harvested material away from the drive unit and thus ensure smooth operation of the pickup reel. The motor rests in that torsionally rigid way on the bearing axle, which bearing axle is fastened on its part in that torsionally rigid manner on the supporting arm and carries the bearing(s) for the reel bearing. As a result of these measures, a simple drive unit of compact size is created which fulfils all requirements placed on a pickup reel.

In order to enable the secure transmission of the driving forces from the motor to the pickup reel, the housing and the internal toothing form a modular unit to which a supporting tube is fastened which is coaxial to the rotating shaft of the pickup reel. The driving forces are conducted at first from the motor via the internal toothing to the housing and thereafter to the supporting tube, as a result of which the pickup reel is put in motion. The pickup reel is suspended or fastened in the known manner on the supporting tube by means of spokes. A favorable and stable support of the pickup reel on the supporting arm associated with the bearing axle is obtained when the pickup reel and/or the supporting tube are held rotatably on the bearing axle. The rotatable bearing of the pickup reel with respect to the bearing axle could also occur via a planetary drive, whereby the task of the bearings is then performed by the planet wheels. As required, either a hydraulic or electric motor is provided as a drive. This is particularly advantageous because the supply lines for said motors can be laid especially easily and without enlarging the overall width of the harvester.

BRIEF DESCRIPTION OF THE DRAWING

The object of the invention is now explained in closer detail by reference to the enclosed drawing, wherein:

FIG. 1 shows in a partially sectional front view of a reaping mechanism of a harvester in accordance with the invention which is not shown in closer detail;

FIG. 2 shows as a reaping mechanism of FIG. 1 in a side view, and

DESCRIPTION OF THE PREFERRED EMBODIMENT

Figure 3:
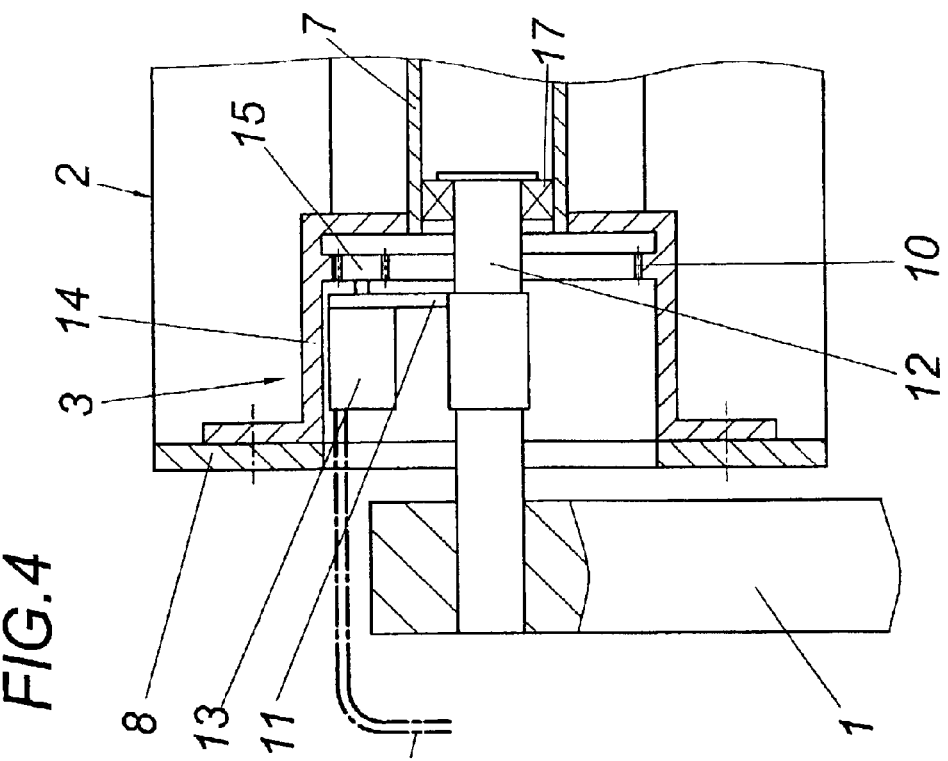
FIGS. 3 and 4 show two embodiments for the pickup reel drive in a partially sectional view and on an enlarged scale.
Figure 4:
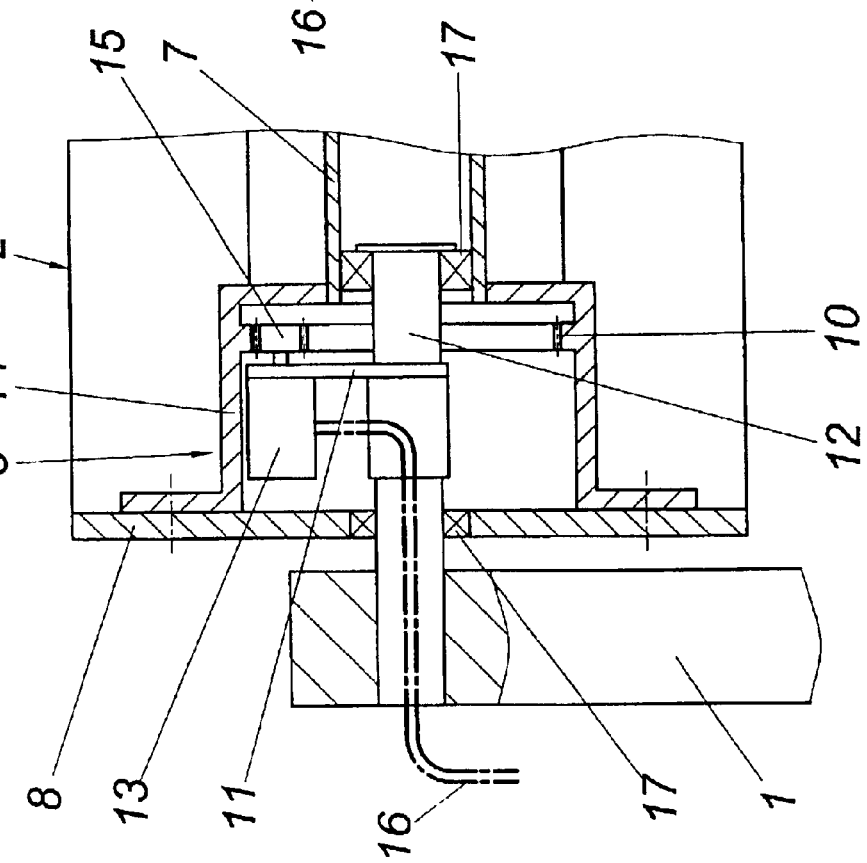

A harvester which is not shown in closer detail comprises a pickup reel 2 which is rotatably held between two supporting arms 1, a drive 3 for the pickup reel 2, and a reciprocating finger bar mover 4 and a feed screw 5 for the reaped material. The pickup reel 2 carries in the usual manner a plurality of reel prongs 6 which are arranged in an evenly distributed manner over the circumference of the pickup reel 2 and comprises a supporting tube 7 as well as several spacer members 8 which ensure the stability of the pickup reel 2. The pickup reel 2 is swivellably articulated with the supporting arms 1 on a cutter mechanism frame 9. The pickup reel 2 can be adjustable not only radially about the rotating shaft of the supporting arms 1, but also axially. The distance between the pivot point of the pickup reel 2 and the pivot point of the supporting arms 1 can thus be changed at will. The drive 3 is arranged within the pickup reel 2 and comprises a gear rim 10 with an internal toothing, which gear rim is torsionally rigidly connected with the pickup reel 2 and is arranged coaxially to the rotational shaft of the pickup reel 2, a motor 13 for the drive 3 of the pickup reel 2 and a housing 14, which motor rests on at least one supporting arm 1. The housing 14 is screwed together with a spacer member 8. The motor 13 is fastened on the one hand with a holding member 11 on the bearing axle 12 which sits in a torsionally rigid way in the supporting arm 1 and engages on the other hand with a driving toothed wheel 15 in the internal toothing of the gear rim 10, whereby it thus ensures the drive of the pickup reel 2. The housing 14 and the gear rim 10 with the internal toothing form a modular unit to which the supporting tube 7 is attached, which tube is coaxial to the rotational shaft of the pickup reel 2. Either the pickup reel 2 and the supporting tube 7 are held rotatably on the bearing axle 12 (FIG. 3), or merely the supporting tube 7 is held rotatably on the bearing axle 12 (FIG. 4). A hydraulic or electric motor is provided as the motor 13 whose supply lines 16 are either led out through the bearing axle 12 from the pickup reel 2 (FIG. 3) or are guided directly to the outside out of the housing 14 (FIG. 4). For the purpose of driving the pickup reel the motor is supplied with electric or hydraulic energy, whereupon the same makes the pickup reel rotate with the desired speed. The pickup reel rests on the one end, as already mentioned, via at least one bearing 17 on the bearing axle 12 and is held at the other end with a shaft butt end 18 in the second supporting arm.

What is claimed is:

1. A harvester comprising:
    (a) a pickup reel supported on a rotational shaft between supporting arms;
    (b) a supporting tube coaxial to said rotational shaft; and
    (c) a drive for said pickup reel arranged within said pickup reel, said drive comprising an internally toothed gear rim having a driving toothed wheel, said gear rim being connected to said pickup reel in a torsionally rigid way and arranged coaxially to said rotational shaft, a drive motor torsionally rigidly supported by a bearing axle on at least one of said supporting arms, and a housing, said drive motor engaging with said driving toothed wheel or arranged with the same into a planetary drive, said housing and said internal toothing forming a modular unit fastened to said supporting tube.

2. A harvester as claimed in claim 1, wherein the pickup reel and/or the supporting tube are held rotatably on the bearing axle.

3. A harvester as claimed in claim 1, wherein a hydraulic motor is provided as said drive motor.

4. A harvester as claimed in claim 1, wherein an electric motor is provided as said drive motor.

* * * * *